United States Patent
Kirchner et al.

(10) Patent No.: US 9,046,077 B2
(45) Date of Patent: Jun. 2, 2015

(54) REACTIVE POWER CONTROLLER FOR CONTROLLING REACTIVE POWER IN A WIND FARM

(75) Inventors: Andreas Kirchner, Osnabrück (DE); Enno Ubben, Steinfurt (DE); Thomas Braam, Dortmund (DE)

(73) Assignee: General Electric Company, Schenectady, NY (US)

( * ) Notice: Subject to any disclaimer, the term of this patent is extended or adjusted under 35 U.S.C. 154(b) by 283 days.

(21) Appl. No.: 13/338,506

(22) Filed: Dec. 28, 2011

(65) Prior Publication Data

US 2012/0101643 A1    Apr. 26, 2012

(51) Int. Cl.
G05D 17/00 (2006.01)
F03D 7/04 (2006.01)
F03D 7/02 (2006.01)
F03D 9/00 (2006.01)
H02J 3/18 (2006.01)
H02J 3/38 (2006.01)
H02J 3/50 (2006.01)

(52) U.S. Cl.
CPC ............ F03D 7/048 (2013.01); F03D 7/0284 (2013.01); F03D 9/003 (2013.01); H02J 3/18 (2013.01); H02J 3/386 (2013.01); H02J 3/50 (2013.01); Y02E 10/723 (2013.01); Y02E 10/763 (2013.01); Y02E 40/30 (2013.01)

(58) Field of Classification Search
USPC .................................. 700/286, 287
See application file for complete search history.

(56) References Cited

U.S. PATENT DOCUMENTS

| | | | |
|---|---|---|---|
| 4,752,726 A | 6/1988 | Aoyama | |
| 5,134,356 A | 7/1992 | El-Sharkawi et al. | |
| 6,219,623 B1 * | 4/2001 | Wills | 702/60 |
| 6,327,162 B1 | 12/2001 | Larsen et al. | |
| 6,810,339 B2 * | 10/2004 | Wills | 702/65 |
| 6,924,565 B2 * | 8/2005 | Wilkins et al. | 290/44 |
| 6,982,546 B2 | 1/2006 | Wu et al. | |
| 7,091,703 B2 | 8/2006 | Folts et al. | |
| 7,265,521 B2 | 9/2007 | Kehrli et al. | |
| 7,312,537 B1 * | 12/2007 | Walling | 290/44 |

(Continued)

OTHER PUBLICATIONS

American Superconductor Corporation, "Optimizing Reactive Compensation for Wind Farms: Meeting Today's Utility and Regulatory Requirements—A White Paper by American Superconductor Corporation", 2006, Retrieved on the Internet at "www.amsuper.com".*

(Continued)

*Primary Examiner* — Mohammad Ali
*Assistant Examiner* — Kelvin Booker
(74) *Attorney, Agent, or Firm* — Global Patent Operation; Douglas D. Zhang (57) ABSTRACT

A reactive power controller for controlling reactive power in a wind farm grid connected to a utility grid and including at least two sub-grids and a collector portion is provided. At least one wind turbine is connected to each sub-grid, wherein the at least two sub-grids are connected to the collector portion and wherein the collector portion establishes the connection to the utility grid. The reactive power controller includes a device for determining an actual reactive power value at the collector portion, and a wind farm controller operatively connected to the device for controlling at least one of said wind turbines on basis of the determined actual reactive power value such that a desired reactive power value is attained.

11 Claims, 8 Drawing Sheets

(56) References Cited

U.S. PATENT DOCUMENTS

| | | | |
|---|---|---|---|
| 7,397,143 B2* | 7/2008 | Walling | 290/44 |
| 7,505,833 B2* | 3/2009 | Delmerico et al. | 700/291 |
| 7,567,160 B2 | 7/2009 | Folts et al. | |
| 7,839,024 B2* | 11/2010 | Cardinal et al. | 307/84 |
| 7,872,453 B2 | 1/2011 | Su | |
| 7,919,951 B2 | 4/2011 | Toki et al. | |
| 8,030,791 B2* | 10/2011 | Lang et al. | 290/44 |
| 8,076,789 B2* | 12/2011 | Miller | 290/44 |
| 8,121,739 B2* | 2/2012 | Haj-Maharsi et al. | 700/287 |
| 8,249,852 B2* | 8/2012 | Thulke | 703/18 |
| 8,317,471 B2* | 11/2012 | Axelsson et al. | 416/41 |
| 8,350,397 B2* | 1/2013 | Lang et al. | 290/44 |
| 8,860,236 B2* | 10/2014 | Nasiri | 290/44 |
| 2001/0056330 A1* | 12/2001 | Wills | 702/60 |
| 2003/0227172 A1 | 12/2003 | Erdman et al. | |
| 2005/0040655 A1* | 2/2005 | Wilkins et al. | 290/44 |
| 2007/0290506 A1* | 12/2007 | Walling | 290/44 |
| 2008/0093855 A1* | 4/2008 | Walling | 290/44 |
| 2009/0160187 A1* | 6/2009 | Scholte-Wassink | 290/44 |
| 2009/0218817 A1 | 9/2009 | Cardinal et al. | |
| 2010/0025995 A1* | 2/2010 | Lang et al. | 290/44 |
| 2010/0094474 A1 | 4/2010 | Larsen et al. | |
| 2010/0109328 A1* | 5/2010 | Li et al. | 290/44 |
| 2010/0138058 A1 | 6/2010 | Kirchner et al. | |
| 2010/0156192 A1 | 6/2010 | Wang et al. | |
| 2010/0237834 A1* | 9/2010 | Alonso Sadaba et al. | 323/205 |
| 2011/0089693 A1* | 4/2011 | Nasiri | 290/44 |
| 2011/0178646 A1* | 7/2011 | Haj-Maharsi et al. | 700/287 |
| 2011/0187106 A1* | 8/2011 | Ichinose et al. | 290/44 |
| 2011/0316490 A1* | 12/2011 | Lang et al. | 322/21 |
| 2012/0029892 A1* | 2/2012 | Thulke | 703/7 |
| 2012/0061964 A1 | 3/2012 | Kirchner | |
| 2012/0134807 A1* | 5/2012 | Axelsson et al. | 416/1 |
| 2012/0136494 A1* | 5/2012 | Kirchner et al. | 700/287 |
| 2012/0242295 A1* | 9/2012 | Bech et al. | 322/87 |
| 2012/0310423 A1* | 12/2012 | Taft | 700/286 |
| 2012/0310424 A1* | 12/2012 | Taft | 700/286 |
| 2012/0310435 A1* | 12/2012 | Taft | 700/297 |
| 2012/0310558 A1* | 12/2012 | Taft | 702/61 |
| 2012/0310559 A1* | 12/2012 | Taft | 702/62 |
| 2013/0002211 A1* | 1/2013 | Egedal et al. | 323/208 |
| 2013/0026756 A1* | 1/2013 | Andresen et al. | 290/44 |
| 2013/0043725 A1* | 2/2013 | Birkelund | 307/24 |
| 2013/0128630 A1* | 5/2013 | Jensen et al. | 363/35 |
| 2013/0138257 A1* | 5/2013 | Edenfeld | 700/287 |
| 2013/0156577 A1* | 6/2013 | Esbensen et al. | 416/1 |
| 2013/0181532 A1* | 7/2013 | KJ R | 307/82 |

OTHER PUBLICATIONS

IEEE PES Wind Plant Collector System Design Working Group, "Reactive Power Compensation for Wind Power Plants", Oct. 2009, IEEE Xplore.*

Chen, Z., "Issues of Connecting Wind Farms into Power Systems", 2005, IEEE/PES Transmission and Distribution Conference and Exhibition: Asia and Pacific Dalian, China.*

Marsh, G., "Wind: Preventing Grid Voltage Jitters", Apr. 2008, Retrieved from the Internet at "RenewableEnergyFocus.com".*

Opila, D.F.; Zeynu, A.M.; Hiskens, I.A., "Wind Farm Reactive Support and Voltage Control", Aug. 2010, 2010 IREP Symposium-Bulk Power System Dynamics and Control—VIII (IREP).*

Qiao, W.; Harley, R.G.; Venayagamoorthy, G.K., "Coordinated Reactive Power Control of a Large Wind Farm and a STATCOM Using Heuristic Dynamic Programming", Jun. 2009, IEEE Transactions on Energy Conversion, vol. 24, No. 2.*

Rodriguez, P.; Timbus, A.; Teodorescu, R.; Liserre, M. and Blaabjerg, "Reactive Power Control for Improving Wind Turbine System Behavior Under Grid Faults", Jul. 2009, IEEE Transactions on Power Electronics, vol. 24, No. 7.*

Su, X.; Mi, Z.; Liu, X and Wu, T., "Reactive Power Optimization Control of Wind Farms with Fixed-Speed Wind Turbine Generators", Oct. 2008, IEEE International Conference on Sustainable Energy Technologies (ICSET 2008).*

Miller, N. W., "Ge Energy—Voltage and Reactive Power Control", Aug. 2011, BPA Voltage Control Technical Conference.*

Scheiber, D., "Power Electronics for Wind Turbine", Feb. 2005, Semikron Elektronik GmbH and Co.KG.*

Clark, K.; Miller, N.W. and Walling, R., "Modeling of GE Solar Photovoltaic Plants for Grid Studies", Apr. 2006, GE International, Inc., Ver. 1.1.*

Miller, N.; Delmerico, R. and Cardinal, M., "GE Wind Plant Dynamic Performance for Grid and Wind Events", Apr. 2009, AEE Techwindgrid, GE International, Inc.*

Clark, K.; Miller, N.W. and Walling, R., "GE Energy, Modeling of GE Solar Photovoltaic Plants for Grid Studies", Apr. 16, 2010, Version 1.1, General Electric International, Inc.*

Berglund, A., "Control System for Reactive Power of an Offshore Wind Farm", Mar. 2010, Uppsala Universitet.*

Cagnano, A.; Tuglie, Tuglie, E.D.; Liserre, M.; Mastromauro, R.A., "Online Optimal Reactive Power Control Strategy of PV Inverters", Oct. 2011, IEEE Transactions on Industrial Electronics, vol. 58, No. 10.*

Skolthanarat, S., "The Modeling and Control of a Wind Farm and Grid Interconnection in a Multi-Machine System", Aug. 2009, Dissertation for Doctor of Philosophy in Electrical Engineering, Virginia Polytechnic Institute and State University.*

Energie, "General Information, Wind Turbine Grid Connection and Interaction", 2001, European Communities.*

Hu, J.; Shang, L.; He, Y. and Zhu, Z.Q., "Direct Active and Reactive Power Regulation of Grid-Connected DC/AC Converters Using Sliding Mode Control Approach", Jan. 2011, IEEE Transactions on Power Electronics, vol. 26, No. 1.*

Martander, O., "DC Grids for Wind Farms", 2002, Department of Electric Power Engineering, Chalmers Univeristy of Technology.*

Malekpour, A.R., Pahwa, A. "Reactive power and voltage control in distribution systems with photovoltaic generation," 44th North American Power Symposium (NAPS), Urbana-Champaign, Illinois, Sep. 2012.*

Ullah, N.R., "Small Scale Integration of Variable Speed Wind Turbines into the Local Grid and Its Voltage Stability Aspects", Nov. 2005, 2005 International Conference on Future Power Systems.*

U.S. Appl. No. 13/332,537, filed Dec. 21, 2011, Andreas Krichner, et al.

Diaz-Dorado, et. al., "Control Algorithm for Coordinated Reactive Power Compensation in a Wind Park" IEEE Transactions on Energy Conversion, vol. 23, No. 4, Dec. 2008.

Diaz-Dorado, et. al., "Coordinated Reactive Compensation in a Wind Park" 9th International Conference Electrical Power Quality and Utilisation, Barcelona, Oct. 9-11, 2007.

* cited by examiner

REACTIVE POWER CONTROLLER FOR CONTROLLING REACTIVE POWER IN A WIND FARM

BACKGROUND OF THE INVENTION

The subject matter described herein relates generally to systems for operating a plurality of wind turbines in a wind farm, and more particularly, to systems for controlling reactive power generated in the wind farm.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electrical power to a frequency substantially similar to a utility grid frequency. Moreover, such converters, in conjunction with the DFIG, also transmit electrical power between the utility grid and the generator as well as transmit generator excitation power to a wound generator rotor from one of the connections to the electrical utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Known wind turbines have a plurality of mechanical and electrical components. Each electrical and/or mechanical component may have independent or different operating limitations, such as current, voltage, power, and/or temperature limits, than other components. Moreover, known wind turbines typically are designed and/or assembled with pre-defined rated power limits. To operate within such rated power limits, the electrical and/or mechanical components may be operated with large margins for the operating limitations. Such operation may result in inefficient wind turbine operation, and a power generation capability of the wind turbine may be underutilized.

When a plurality of wind turbines are arranged in a wind farm, reactive power generated by individual wind turbines may be different. In particular, an increasing size of wind farms results in an increasing area for the wind farm such that the difference in reactive power production, e.g. due to difference in topology increases as well. As an adjustable power factor PF is desired, such as a power factor of one (PF=1), controlling a large number of wind turbines with the identical or nearly identical commands for compensating reactive power is not efficient. The larger the wind farm, the wider the area for the installation of individual wind turbines is. Thus, long electrical connections between individual wind turbines and an electrical collector bar for collecting the energy provided by the individual wind turbines is an issue. Therefore, an efficient and cost-effective power control for wind turbines arranged in a wind farm is desired.

BRIEF DESCRIPTION OF THE INVENTION

In one aspect, a reactive power controller for controlling reactive power in a wind farm grid connected to a utility grid and including at least two sub-grids and a collector portion is provided, wherein at least one wind turbine is connected to each sub-grid, wherein the at least two sub-grids are connected to the collector portion and wherein the collector portion establishes the connection to the utility grid, the reactive power controller including a device for determining an actual reactive power value at the collector portion; and a wind farm controller operatively connected to the device for controlling at least one of said wind turbines on basis of the determined actual reactive power value such that a desired reactive power value is attained.

In another aspect, a reactive power controller for controlling reactive power in a wind farm grid connected to a utility grid and including at least two sub-grids and a collector portion is provided, wherein at least one wind turbine is connected to each sub-grid, wherein the at least two sub-grids are connected to the collector portion and wherein the collector portion establishes the connection to the utility grid, the reactive power controller including at least one sub-grid measurement device arranged at each sub grid, for measuring a reactive power component at each sub grid, and at least one sub-grid controller operatively connected to the sub-grid measurement device for controlling at least one of said wind turbines on basis of the measured reactive power components such that a desired reactive power value is attained.

In yet another aspect, a wind farm is provided. The wind farm includes a wind farm grid connected to a utility grid and including at least two sub-grids and a collector portion, wherein at least one wind turbine is connected to each sub-grid, wherein the at least two sub-grids are connected to the collector portion and wherein the collector portion establishes the connection to the utility grid; and a reactive power controller operatively connected to the wind farm grid, the reactive power controller having a device for determining an actual reactive value at the collector portion, and a wind farm controller operatively connected to the device for controlling at least one of said wind turbines on basis of the determined actual reactive power value such that a desired reactive power value is attained.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a reactive power controller for a wind farm having a wind farm grid including at least two sub-grids electrically connected to each other. The reactive power controller includes a determination device such as a grid measurement device which is designed for measuring a reactive power component of electrical power generated by at least one wind turbine in the sub-grid. Furthermore, the reactive power controller includes a wind farm controller for controlling power generation at least one sub-grid on the basis of the measured reactive power component. In this way, the reactive power component may be controlled with respect to at least one other sub-grid.

As used herein, the term "wind farm grid" is intended to be representative of an electrical grid for an electrical connection of devices used in a wind farm. As used herein, the term "sub-grid" is intended to be representative of an electrical grid provided for an electrical connection of a specific number of wind turbines in a wind farm, such as a group or string of wind turbines which may be connected to the same power output cable, or of a virtual group of wind turbines which are controlled. Such group may also be regarded as a "logical group" or a "virtual group" of individual wind turbines. As used herein, the term "wind farm topology" is intended to be representative of a specific topographic arrangement of wind turbines, e.g. an arrangement in sub-grids or strings. As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "power factor" is intended to be representative of a cosine of an angle φ with cos(φ) being a ratio of an effective power P and an absolute value of the complex power $|S|$.

Figure 1:
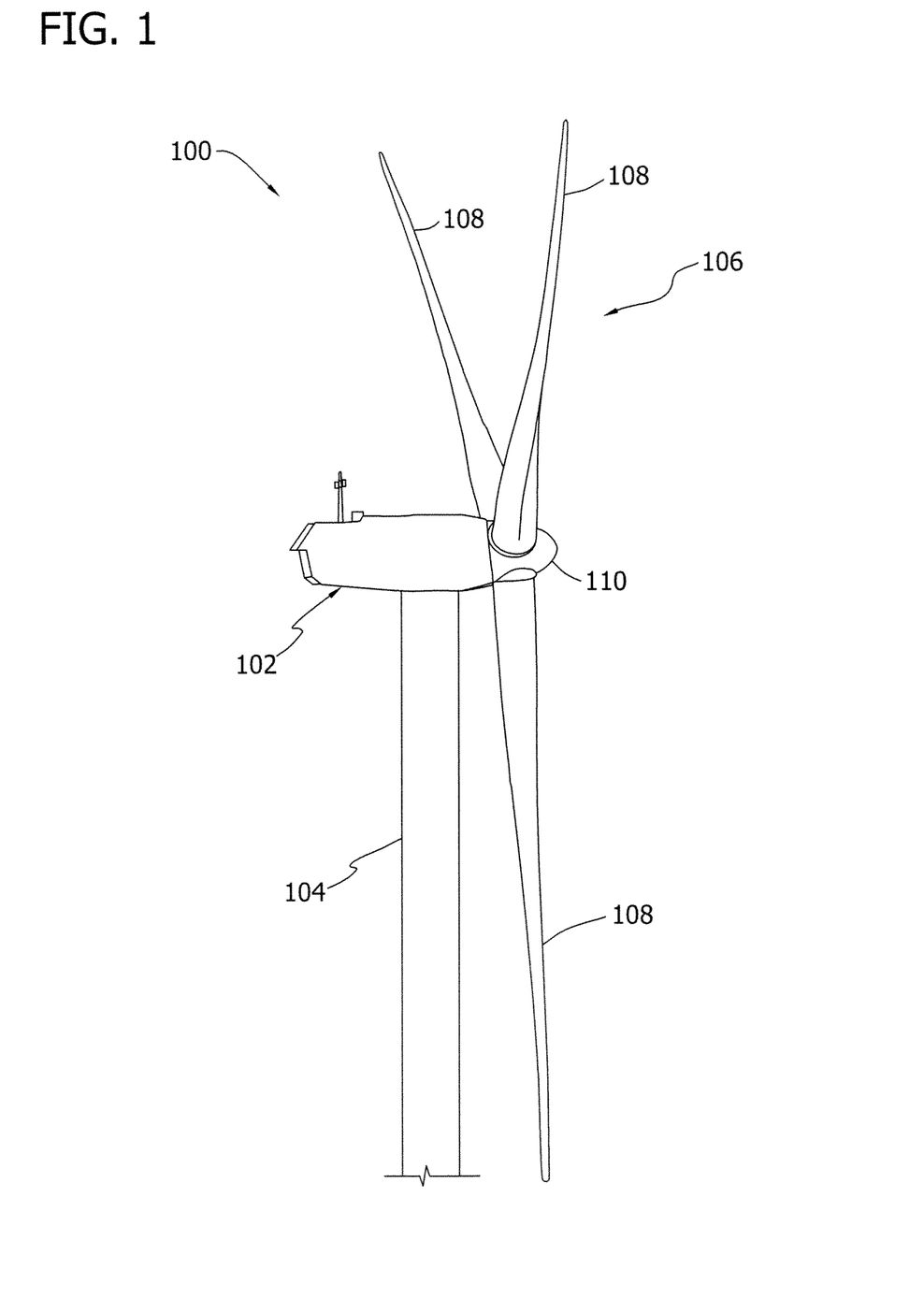
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

Figure 2:
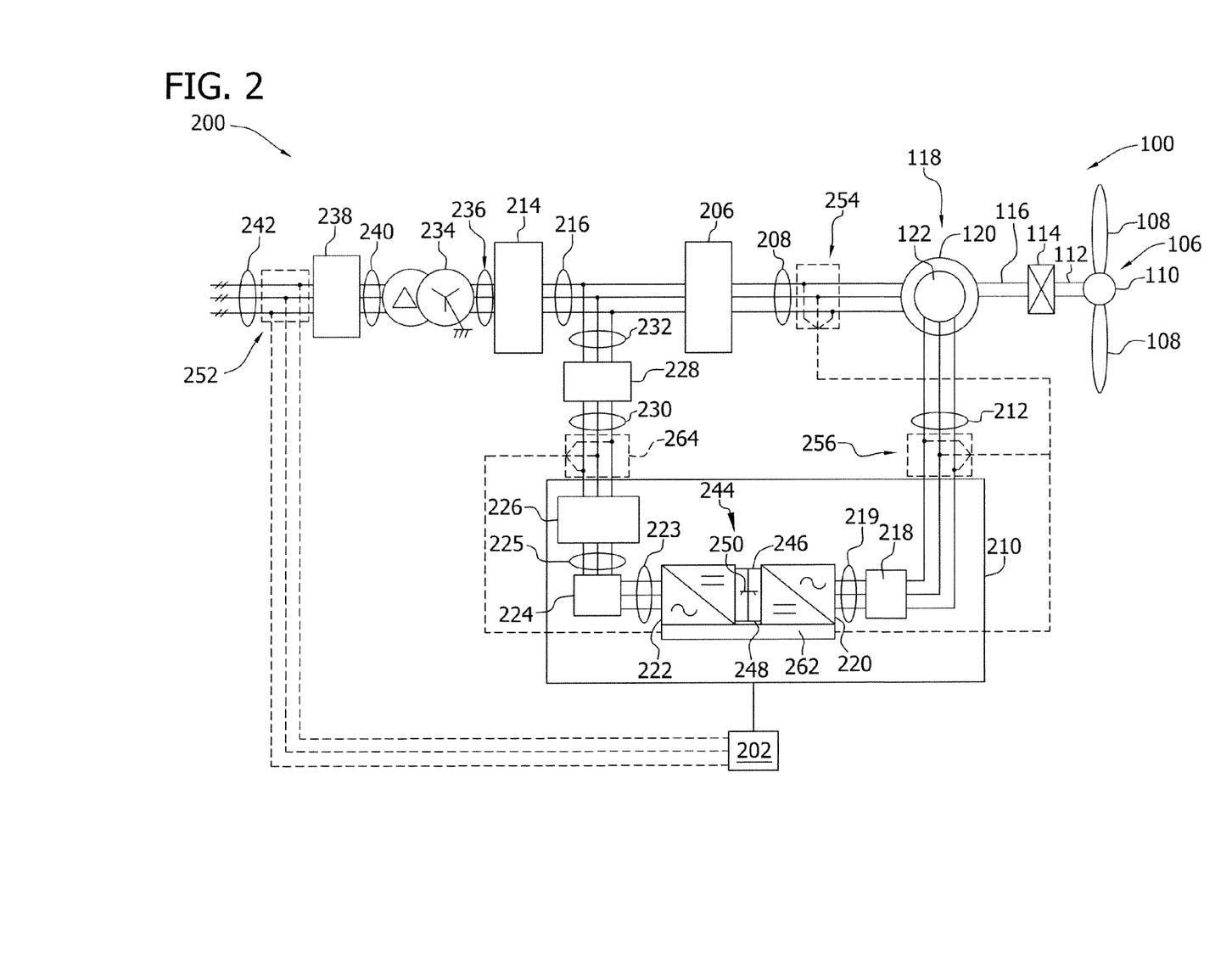
FIG. 2 is a schematic view of an exemplary electrical and control system suitable for use with the wind turbine shown in FIG. 1.

FIG. 2 is a schematic view of an exemplary electrical and control system 200 that may be used with wind turbine 100. Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electrical power between generator stator 120 and an electrical power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electrical power main transformer 234 via a generator-side bus 236. Main transformer 234 is electrically coupled to a grid circuit breaker 238 via a breaker-side bus 240. Grid circuit breaker 238 is connected to the electrical power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electrical power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electrical current measurement signals from a first set of voltage and electrical current sensors 252. Moreover, turbine controller 202 is configured to monitor and control at least some of the operational variables associated with wind turbine 100. In the exemplary embodiment, each of three voltage and electrical current sensors 252 are electrically coupled to each one of the three phases of grid bus 242. Alternatively, voltage and electrical current sensors 252 are electrically coupled to system bus 216. As a further alternative, voltage and electrical current sensors 252 are electrically coupled to any portion of electrical and control system 200 that facilitates operation of electrical and control system 200 as described herein. As a still further alternative, turbine controller 202 is configured to receive any number of voltage and electrical current measurement signals from any number of voltage and electrical current sensors 252 including, but not limited to, one voltage and electrical current measurement signal from one transducer.

As shown in FIG. 2, electrical and control system 200 also includes a converter controller 262 that is configured to receive a plurality of voltage and electrical current measurement signals. For example, in one embodiment, converter controller 262 receives voltage and electrical current measurement signals from a second set of voltage and electrical current sensors 254 coupled in electronic data communication with stator bus 208. Converter controller 262 receives a third set of voltage and electrical current measurement signals from a third set of voltage and electrical current sensors 256 coupled in electronic data communication with rotor bus 212. Converter controller 262 also receives a fourth set of voltage and electrical current measurement signals from a fourth set of voltage and electrical current sensors 264 coupled in electronic data communication with conversion circuit breaker bus 230. Second set of voltage and electrical current sensors 254 is substantially similar to first set of voltage and electrical current sensors 252, and fourth set of voltage and electrical current sensors 264 is substantially similar to third set of voltage and electrical current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electrical power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electrical current sensors 254, third set of voltage and electrical current sensors 256, and fourth set of voltage and electrical current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electrical power being channeled through power conversion assembly 210 to approximately zero.

Figure 3:
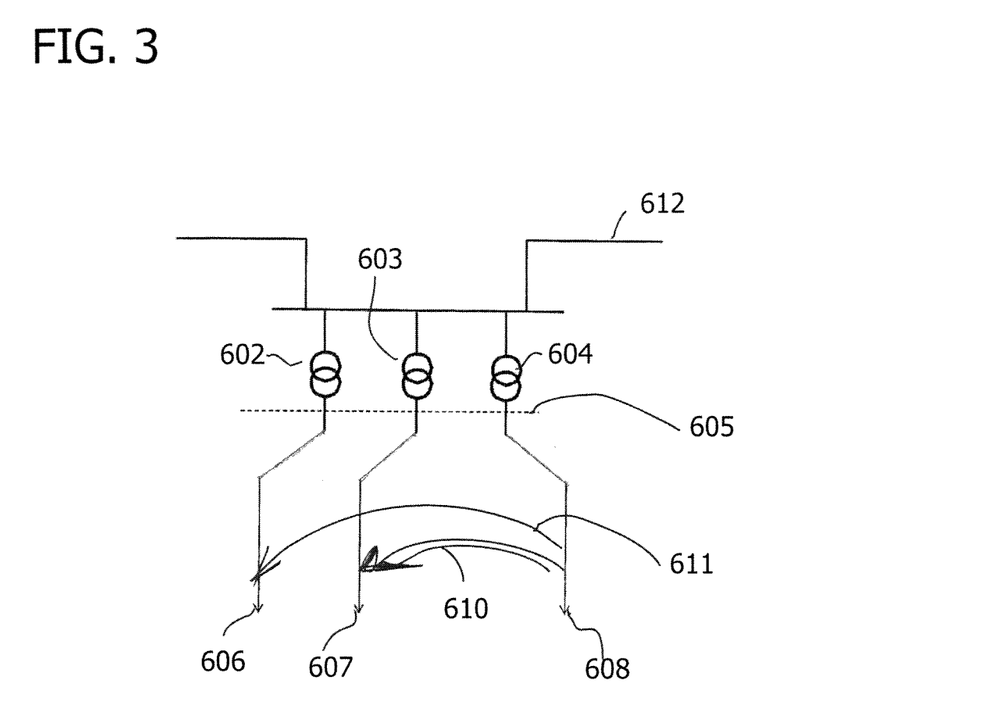
FIG. 3 is a schematic circuit diagram of a connection of different substations to a utility grid.

FIG. 3 is a schematic diagram illustrating a connection scheme for individual substations 606, 607, and 608 to a common power line 612. The substations 606, 607, and 608 may form associated sub-grids, wherein each sub-grid may include an associated sub-grid transformer (illustrated in FIGS. 4 and 5). A reference numeral 605 indicates a region of reactive power compensation. A first substation 606, a second substation 607 and a third substation 608 are provided. The power $\underline{S}$ delivered by the individual substations respectively includes effective power components P and reactive power components Q. It is noted here, although determining reactive power components is described herein, effective power components P and/or power $\underline{S}$ may be determined such that reactive power components may be evaluated using $\underline{S}$ and P.

In order to reduce unwanted reactive power components Q, or to control reactive power such that a desired reactive power value and/or a desired power factor is obtained, a first reactive power compensation 610 may be provided by transferring reactive power Q between the substation 608 and the substation 607. Furthermore, a second reactive power compensation 611 may be provided by a transfer from the substation 608 to the substation 606 (shown by arrows 610, 611 in FIG. 3). It is noted here that, as used herein, the term "reactive power compensation" is intended to be representative of a reactive power control which may result in a complete or a partial compensation of reactive power, e.g. according to requirements of an external utility grid and/or other loads connected to the wind farm grid.

As an example, the three substations 606, 607 and 608 each may include 20 wind turbines. Furthermore, according to the present example, a cable charge load of substation 606 is 10 MVAr capacitive, a cable charge load at the substation 607 is 20 MVAr capacitive and a cable charge load at the substation 608 is 30 MVAr capacitive. Thus, according to the example described herein, the sum of cable charge loads amounts to 10 MVAr+20 MVAr+30 MVAr=60 MVAr. A wind farm management system without individual control of sub-grids will provide identical or nearly identical commands for each wind turbine. These commands are estimated as follows: 60 MVAr/60=1.0 MVAr inductive. Taking into account that the individual sub-grids have different lengths and the number of wind turbines connected to a sub-grid may be different, the reactive power Q generated by the reactance and inductance of cable and transformers may be different. In case a park voltage, VAR or power-factor (PF) regulator regulates a park set-point and adjusts all wind turbines using the same VAR command, the reactive power Q generated in the sub-grids will be different. Situations might occur where in one sub-grid the reactive power Q may be positive, whereas in another sub-grid the reactive power Q may be negative. Then, a compensating reactive power flow between the sub-grids may occur which may stress one or more of the sub-grid transformers and/or the collector bar. As a result an inefficient operation of the entire wind farm can occur.

Electrical power provided by the individual substations is fed to associated electrical transformers, e.g. a first high-voltage transformer 602, a second high-voltage transformer 603 and a third high-voltage transformer 604. Each of these transformers may provide the transformation of 110 kV to 400 kV, i.e. from high-voltage region to ultra high-voltage region (3×110 kV to 3×400 kV).

The first reactive power compensation 610 may be provided from substation 608 to substation 607. Furthermore, the second reactive power compensation 611 may be provided from substation 608 to substation 606. Thus, substation 608 includes turbines which pull less reactive power Q than requested via the power line, wherein the substations 606 and 607 include wind turbines which pull more reactive power Q than requested via the power line. In this case an undesired equalization of reactive power via the 110 kV bus bar may occur. It is noted here that electrical connection lines within the wind farm typically contribute to capacitive portion of reactive power, whereas the at least one wind turbine connected to an associated sub-grid typically contributes to inductive portion of reactive power. The capacitive portion of reactive power is more or less constant due to fixed wiring and thus unchanged electrical connection lines during operation of the at least one wind turbine. The inductive portion of reactive power, however, may be adjusted at an individual wind turbine such that above mentioned one or more reactive power compensations 610, 611 may be provided. Controlling inductive portions of reactive power at individual wind turbines thus allows capacitive portions of reactive power resulting from electrical connection lines within the wind farm to be compensated. Larger wind farms occupy a larger area for wind turbine installation. This fact results in long power transfer cables for collecting energy from individual wind turbines. In order to reduce cost of cabling, the number of wind turbines connected to a cable is limited. All sub-grid-cables are connected to a common collector bar in the substation. In this case, reactive power compensation flow could appear and increase the losses of the entire wind farm.

According to a typical embodiment of the present invention, the individual substations 606, 607 and 608 may be controlled such that reactive power for the substations is compensated individually. In this case no equalization via the 110 kV bus bar is performed. Thus, each power line to the individual substations 606, 607 and 608 is compensated separately in order to provide a desired power factor PF, e.g. a power factor PF of one (PF=1). Thus, the cosine of the angle $\phi$ between effective power P and output power $|S|$ may be set to $\cos(\phi)=1$ with $\cos(\phi)=P/|S|$. Therefore, the relation PF=1 corresponds to $\phi=0°$ or Q=0.

Figure 4:
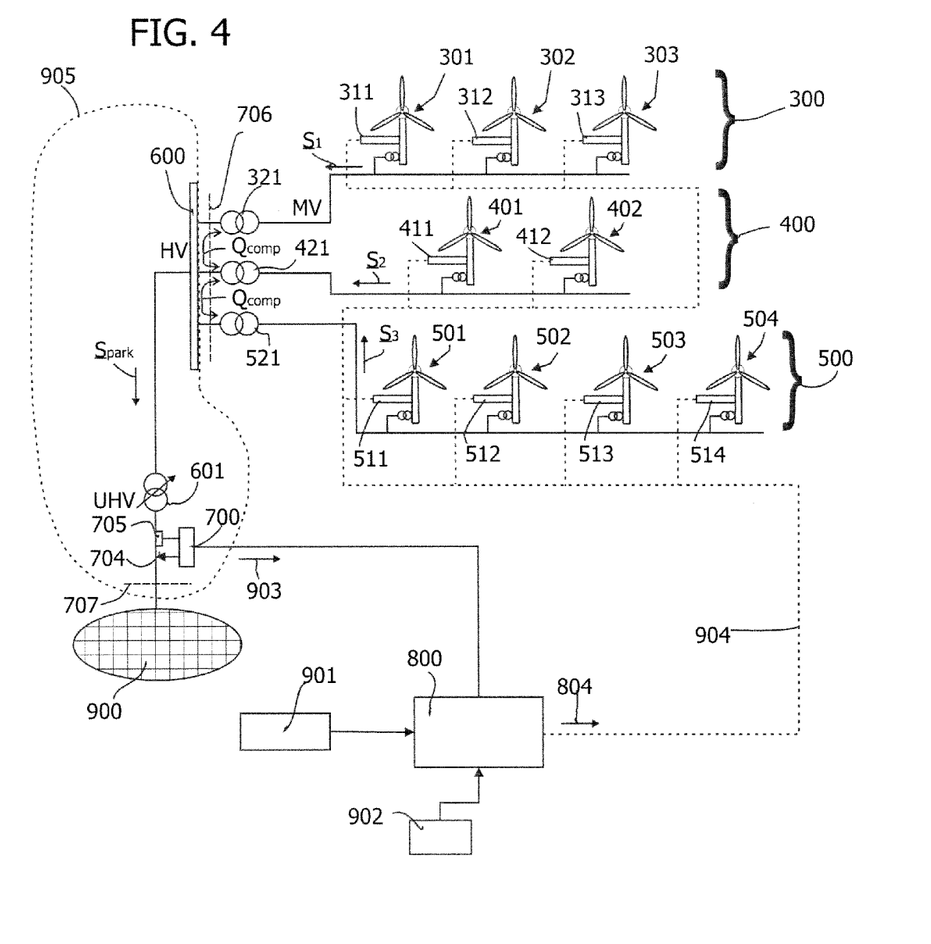
FIG. 4 is a detailed diagram showing a set-up for a control scheme in a wind farm including three different sub-grids, according to a typical embodiment.

FIG. 4 is a schematic diagram showing a set-up of a wind farm according to a typical embodiment. The wind farm topology illustrated in FIG. 4 includes an arrangement of wind turbines, e.g. an arrangement of wind turbines in sub-grids or strings. Such topology arrangement may be stored in a memory such that reactive power components and/or power factors resulting from, or being influenced by, the topology of a specific sub-grid or a number of sub-grids may be evaluated on basis of known and stored topology. A wind farm grid is connected to a utility grid 900 and includes at least two sub-grids 300, 400, 500 and a collector portion 905. The at least one wind turbine is connected to each sub-grid 300, 400, 500, wherein the at least two sub-grids 300, 400, 500 are connected to the collector portion 905 and wherein the collector portion 905 establishes the connection to the utility grid 900. A reactive power controller is operatively connected to the wind farm grid, wherein the reactive power controller includes a determination device for determining an actual reactive power value at the collector portion 905 and a wind farm controller 800 operatively connected to the determination device 700 for controlling at least one of said wind turbines on basis of the determined actual reactive power value such that a desired reactive power value is attained.

Thus, the wind farm shown in FIG. 4 includes three sub-grids, i.e. a first sub-grid 300, a second sub-grid 400 and a third sub-grid 500. It is noted here, although not shown in the drawings, that more than three sub-grids or less than three sub-grids may be provided. The collector portion 905 (broken line in FIG. 4) may include a collector bar 600, a substation transformer 601 and a determination device 700, and may represent a connection to the utility grid 900 via a grid regulation point 707. According to a typical embodiment which can be combined with other embodiments described herein, an actual reactive power value Q may be measured at the grid regulation point 707. Thereby, a desired output power factor—or a desired reactive power value at the output—of the wind farm grid at the collector portion 905—and, in turn, a desired reactive power value of the wind farm grid—may be provided for a utility grid connected to the wind farm grid. In other words, controlling at least one of said wind turbines on basis of the determined actual reactive power value may be used for attaining a desired reactive power value. Furthermore, determining an actual power value of the generated electrical power output by the wind farm grid, to an external utility grid, may include evaluating or measuring a reactive power components at one or all sub-grids on basis of the topology of at least one sub-grid. It is noted here that a desired reactive power value and/or a desired power factor PF may be adjusted at the collector bar 600. The adjusted power factor PF at a take-over point 706 (broken line in FIG. 4) is a basis for billing the generated electrical power. Thus, a power factor PF=1 at the collector bar may be advantageous even though the power factor at the grid regulation point 707 is less than 1. In other words, it may be desirable for the operator of the wind farm to provide a power factor PF close to one at a location (e.g., at the collector bar 600 of FIG. 4) within the wind farm grid where this power factor represents the basis for billing. Using the method according to one or more typical embodiments described herein, it is thus possible to adjust this power factor on basis of sub-grid measurements.

Each sub-grid 300, 400, 500 includes at least one wind turbine 301-303, 401, 402, and 501-504. Electrical power is generated with at least one of said wind turbines and fed to the sub-grid to which the at least one wind turbine is connected. It is noted here that topology may influence reactive power components in a sub-grid. Thus, reactive power in one sub-grid may be different from reactive power in another sub-grid, e.g. due to different cable lengths, different number of wind turbines connected to a sub-grid, etc. In this way, topology is a factor which may be considered when reactive power components are controlled. In the embodiment shown in FIG. 4, the first sub-grid 300 includes three wind turbines 301, 302, 303, the second sub-grid 400 includes two wind turbines 401 and 402, and the third sub-grid 500 includes four wind turbines 501, 502, 503 and 504. The actual reactive power value may be determined at the collector portion 905.

Each individual wind turbine 301-303, 401-402, 501-503 includes an associated wind turbine controller. Furthermore, for each sub-grid 300, 400 and 500 an associated sub-grid transformer for connecting the respective sub-grid 300, 400 and 500 to the common collector bar 600 may be provided. Such sub-grid transformer may be adapted for transferring electrical power in a range from 150 MW to 250 MW. The common collector bar is used for collecting electrical power generated by the individual wind turbines. A resulting electrical power $\underline{S}_{park}$ is transferred to the substation transformer 601 which transforms the electrical power $\underline{S}_{park}$ from a high-voltage region HV to an ultra high-voltage region (UHV region). The substation transformer 601 may be regarded as a main transformer in the wind farm. At the UHV side of the substation transformer 601, a utility grid 900 may be connected. Thus, the wind farm grid electrically connected to at least two sub-grids may be connected to the utility grid and the generated power may be transferred from the wind farm having at least two sub-grids to the utility grid. A grid regulation point is indicated by a reference numeral 707. At the grid regulation point 707, voltages and currents may be measured by a grid measurement device 700 such that reactive power control is possible.

According to a typical embodiment which can be combined with other embodiments described herein, the grid measurement device 700 may include a voltage sensor 704 and a current sensor 705 such that effective power components P and reactive power components Q may be detected at the secondary side of the substation transformer 601. A measurement signal 902 which is output from the grid measurement device 700 is used for controlling a wind farm controller 800 connected to the grid measurement device 700. In addition to that, the wind farm controller 800 is connected to a utility input device 901 for inputting a desired control status for individual wind turbines and to a human-machine interface 902 for inputting user commands. A wind farm control signal 804 is output from the wind farm controller 800 and may be used for controlling individual wind turbines via their associated wind turbine controllers. In order to provide wind turbine control, the wind farm controller 800 is connected to the individual wind turbines 301-303; 401-402; 501-503 via a data communication device 904 such as a communication line (broken lines in FIG. 4). The communication line 904 is used for communicating data signals between the wind farm controller 800 and individual wind turbines/wind turbine controllers.

According to another typical embodiment which may be combined with other embodiments described herein, the data communication device may be provided for communicating data signals between the wind farm controller and at least one wind turbine, wherein the data communication device may be selected from a group consisting of a local area network, a wireless LAN, Internet, an optical wave guide and any combination thereof.

The grid measurement device 700 for measuring a reactive power component $Q_{park}$ of electrical power $\underline{S}_{park}$ generated by the wind turbines may include at least one sensor selected from the group consisting of a voltage sensor 704, a current sensor 705, a power meter, a VAR-sensor, and any combination thereof. Using the grid measurement device 700 according to a typical embodiment herein described with respect to FIG. 4, the reactive power component $Q_{park}$ contained in the generated power $\underline{S}_{park}$ (including effective power and reactive power components) may be determined.

Each sub-grid 300, 400 and 500 includes a group of wind turbines 301-303; 401-402; 501-503 which are connected to the same power output cable such that a group of wind turbines may be controlled with respect to their output power. The output power at the individual sub-grid 300, 400 and 500 is according to the following equations (1), (2) and (3), respectively:

$$\underline{S}_1 = P_1 + jQ_1 \tag{1}$$

$$\underline{S}_2 = P_2 + jQ_2 \tag{2}$$

$$\underline{S}_3 = P_3 + jQ_3 \tag{3}$$

Thereby, the resulting amount of electrical power $\underline{S}_{park}$ generated by the wind turbines arranged within the wind farm is evaluated using the complex power formulation as defined by the above equations (1), (2) and (3):

$$\underline{S}_{park} = \underline{S}_1 + \underline{S}_2 + \underline{S}_3 \tag{4}$$

Thus, the generated wind farm power $\underline{S}_{park}$ includes effective power components $P_{park}$ and reactive power components $Q_{park}$, as indicated in the following equation (5):

$$\underline{S}_{park} = P_{park} + jQ_{park} \tag{5}$$

Using equation (5) above the sum of reactive power components $Q_{park}$ within the wind farm may be determined using the following equation (6):

$$Q_{park} = Q_1 + Q_2 + Q_3 \tag{6}$$

It is noted here that the individual reactive power components provided by the individual sub-grids 300, 400 and 500 may be written as the sum of respective reactive power components set by a command $Q_{\_command}$ and respective reactive power components due to cable transmission $Q_{\_cabletrans}$. Thus, the following equations (7) to (8) may be used:

$$Q_1 = Q_{1\_command} + Q_{1\_cabletrans} \tag{7}$$

$$Q_2 = Q_{2\_command} + Q_{2\_cabletrans} \tag{8}$$

$$Q_3 = Q_{3\_command} + Q_{3\_cabletrans} \tag{9}$$

As the individual sub-grids 300, 400 and 500 are different from each other, e.g. with respect to topology, to the number of connected wind turbines, cable lengths, area of installation, etc., the reactive power components due to cable transmission $Q_{\_cabletrans}$ are different from each other as well:

$$Q_{1\_cabletrans} \neq Q_{2\_cabletrans} \neq Q_{3\_cabletrans} \quad (10)$$

Thus, if the reactive power components set by a command $Q_{\_command}$ correspond to each other, as indicated in equation (11) below, all wind turbines connected to the respective sub-grids 300, 400 and 500 would be controlled in the same way.

$$Q_{1\_command} = Q_{2\_command} = Q_{3\_command} \quad (11)$$

Then, $Q_{park}$ is set according to the following equation (12):
IF: $Q_2 < 0$
AND: $Q_1 > 0$; $Q_3 > 0$
THEN: $Q_2$ compensated by $Q_1$, $Q_3$ $$Q_{park} = |Q_1| + |Q_3| - |Q_2| \quad (12)$$

According to a typical embodiment, however, an individual control of the reactive power components is provided. The individual reactive power components provided by the cable transmission are calculated and a $Q_{park\_command}$ is output by a control device.

Thus, the reactive power components may be controlled or set by commands $Q_{\_command}$ which are provided individually for the three sub-grids 300, 400 and 500. Moreover, the reactive power components may cancel out such that, e.g. reactive power of at least two sub-grids may compensate each other. Thus the command $Q_{\_command}$ may be weighted according to an effective cable transmission in the respective sub-grid and may be calculated as indicated by the following equation (13) for the first sub-grid 300, by the following equation (14) for the second sub-grid 400 and by the following equation (15) for the third sub-grid 500:

$$Q_{1\_command} = \frac{Q_{park\_command} \cdot Q_{1\_cabletrans}}{Q_{1\_cabletrans} + Q_{2\_cabletrans} + Q_{3\_cabletrans}} \quad (13)$$

$$Q_{2\_command} = \frac{Q_{park\_command} \cdot Q_{2\_cabletrans}}{Q_{1\_cabletrans} + Q_{2\_cabletrans} + Q_{3\_cabletrans}} \quad (14)$$

$$Q_{3\_command} = \frac{Q_{park\_command} \cdot Q_{3\_cabletrans}}{Q_{1\_cabletrans} + Q_{2\_cabletrans} + Q_{3\_cabletrans}} \quad (15)$$

It is noted here that weighting according to the above equations may be provided as a dynamical weighting, e.g. a weighting when one or more cable transmissions $Q_{\_cabletrans}$ change. Thereby, the reactive power components in the individual sub-grids 300, 400 and 500 may be set, and an adjustment of a desired reactive power value of the wind farm grid may be attained.

Furthermore, a complete or partial compensation $Q_{comp}$ of reactive power components Q near the take-over point 706 at the collector bar 600 may be provided. Thus, virtual groups or strings or sub-grids may be used for controlling reactive power Q in these groups without measuring a reactive power in each group. In this way, a segmented reactive power control may be provided. As used herein, the term "reactive power value" is intended to be representative of a value of reactive power which is provided for a utility grid connected to the wind farm grid. It is noted here, although not shown in the drawings, that more than three sub-grids or less than three sub-grids may be provided.

Thus, a reactive power controller for a wind farm having at least two sub-grids includes a grid determination device 700 such as the grid measurement device for measuring a reactive power component Q of electrical power generated by the respective wind turbines, and the wind farm controller 800 for controlling power generation at least one sub-grid on the basis of the measured reactive power component Q such that the reactive power component Q is controlled with respect to at least one other sub-grid.

It is noted here that each sub-grid 300, 400 and 500 may include one wind turbine, two wind turbines or more than two wind turbines. The wind farm controller 800 may include a CPU which cooperates with the grid measurement device 700.

Figure 5:
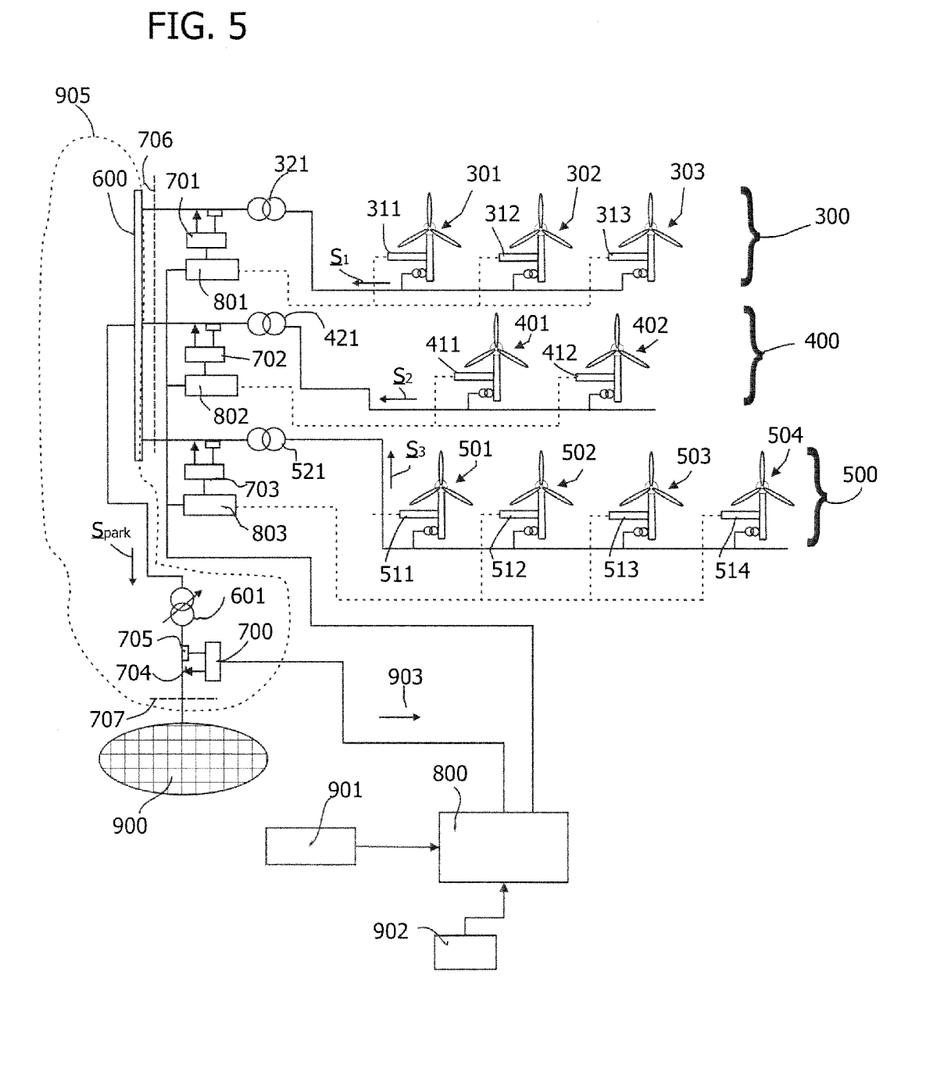
FIG. 5 is a detailed scheme of a wind farm having three individual sub-grids, wherein each sub-grid includes an associated sub-grid controller and a sub-grid measurement device, according to another typical embodiment.

FIG. 5 is a schematic diagram of a set-up of a wind farm according to another typical embodiment. It is noted here that components which have been described with respect to FIG. 4 are not described here in order to avoid a redundant description. A wind farm grid connected to the utility grid 900 is provided and includes at least two sub-grids 300, 400, 500 and the collector portion 905. At least one wind turbine is connected to each sub-grid 300, 400, 500, wherein the at least two sub-grids 300, 400, 500 are connected to the collector portion 905 and wherein the collector portion 905 establishes the connection to the utility grid 900.

As indicated in FIG. 5, each sub-grid 300, 400 and 500 includes a respective sub-grid measurement device, i.e. the first sub-grid 300 includes a first sub-grid measurement device 701, the second sub-grid 400 includes a second sub-grid measurement device 702, and the third sub-grid 500 includes a third sub-grid measurement device 703. In this way, reactive power components Q may be measured directly at the power lines of the respective sub-grids 300, 400 and 500. In this way, according the typical embodiment depicted in FIG. 5, a reactive power component may be determined at each sub-grid 300, 400, 500. Thereby, at least one of said wind turbines may be controlled on basis of the determined reactive power components such that a desired reactive power value is attained. The desired actual power value may be provided at the collector portion 905.

In addition to that, or alternatively, individual sub-grid controllers may be provided. As shown in FIG. 5, the first sub-grid 300 includes a first sub-grid controller 801 connected to the first sub-grid measurement device 701, the second sub-grid 400 includes a second sub-grid controller 802 connected to the second sub-grid measurement device 702, and the third sub-grid 500 includes a third sub-grid controller 803 connected to the third sub-grid measurement device 703. The sub-grid controllers 801, 802 and 803 are connected to the individual wind turbine controllers via sub-grid data communication devices such as communication lines (broken lines in FIG. 5), i.e. the first sub-grid controller 801 is connected to the wind turbine controllers 311, 312 and 313, the second sub-grid controller 802 is connected to the wind turbine controllers 411 and 412, and the third sub-grid controller 803 is connected to the wind turbine controllers 511, 512, 513 and 514. The individual sub-grid controllers 801, 802 and 803 are respectively connected to the wind farm controller 800.

The collector portion 905 (broken line in FIG. 5) may include the collector bar 600, the substation transformer 601 and the determination device 700, and may represent a connection to the utility grid 900 via the grid regulation point 707. According to a typical embodiment which can be combined with other embodiments described herein, the reactive power component Q may be measured at the grid regulation point 707. Thus, in addition to, or alternatively to, measuring reactive power components Q at the power lines of the respective sub-grids 300, 400 and 500 by means of the first sub-grid measurement device 701, the second sub-grid measurement device 702 and the third sub-grid measurement device 703, respectively, the reactive power component Q may be measured at the grid regulation point 707.

Thus, the wind farm controller 800 may be used for controlling the individual sub-grid controllers 801, 802 and 803 which in turn may control the respective wind turbines in the associated sub-grid 300, 400 and 500. It is noted here that current and voltage measurements provided by the sub-grid measurement devices are performed at a secondary side of the respective sub-grid transformers 321, 421 and 521. The sub-grid transformers 321, 421 and 521 are used to transform the power generated by the individual sub-grids 300, 400 and 500 from the medium-voltage range MV to the high-voltage range HV. Thus, voltage and current measurement is performed at the high-voltage side (HV) of the sub-grid transformers 321, 421 and 521.

One or more of the sub-grid controllers 801, 802 and 803 for controlling power generation at least one of the sub-grids 300, 400 and 500 on the basis of a reactive power component Q measured by the respective grid measurement device 701, 702 and 703 are used for controlling the reactive power component Q with respect to at least one other sub-grid. Thereby, after generating electrical power with at least one of said wind turbines and feeding the generated electrical power to the sub-grid to which the at least one wind turbine is connected, a reactive power component at each sub-grid may be determined and at least one of said wind turbines on basis of the determined reactive power components may be controlled such that a desired reactive power value is attained. The desired reactive power value may be provided at the collector portion 905.

It is noted here that the first sub-grid measurement device 701 and/or the second sub-grid measurement device 702 and/or the third sub-grid measurement device 703 may include at least one sensor selected from the group consisting of a voltage sensor, a current sensor, a power meter, and VAR-sensor, and any combination thereof. The data communication lines between the individual wind turbines and the associated sub-grid controller within a sub-grid (broken lines in FIG. 5) may be replaced by other communication devices such as, but not limited to, a local area network, a wireless LAN, Internet, an optical waveguide, and any combination thereof.

Figure 6:
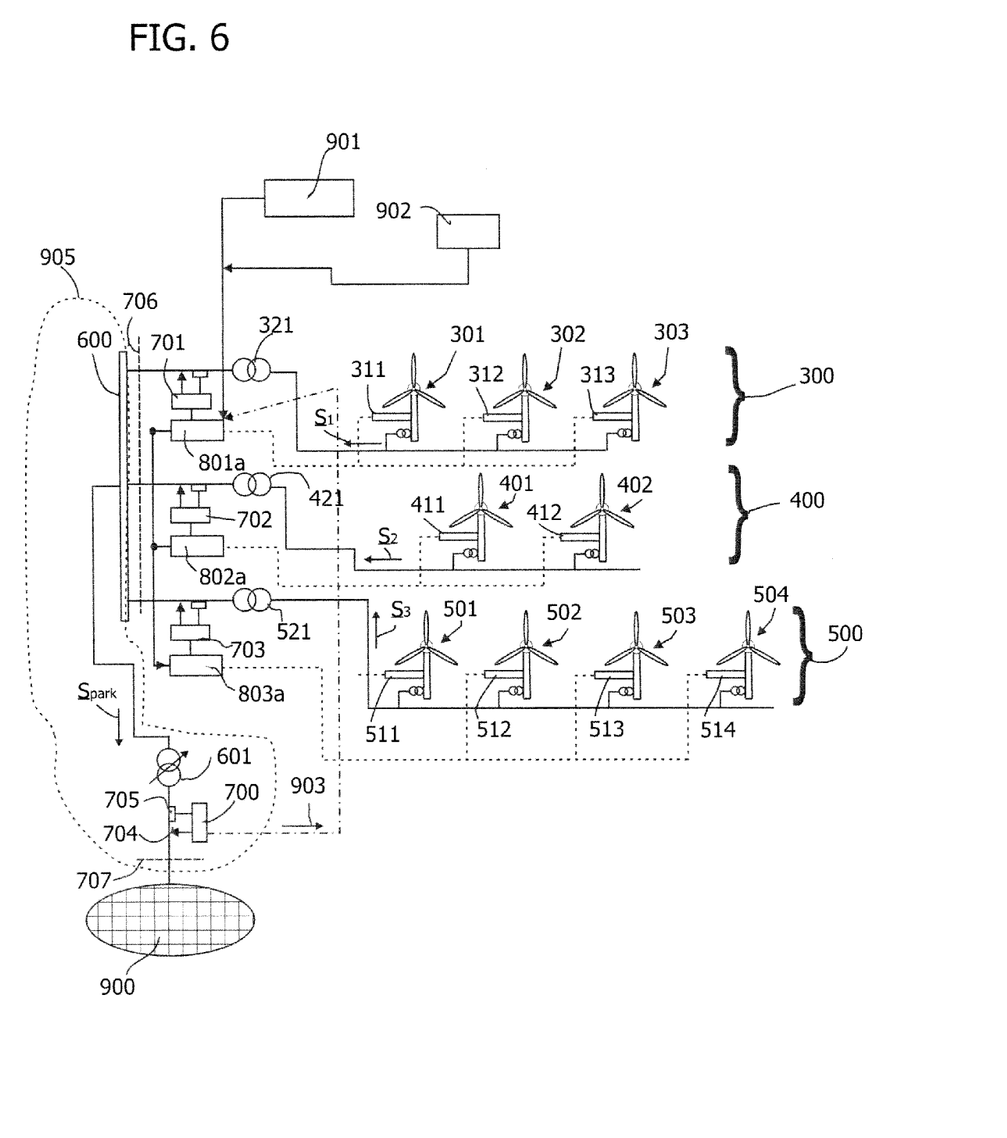
FIG. 6 is a detailed scheme of a wind farm having three individual sub-grids, wherein primary and secondary controllers are provided at each sub-grid, according to yet another typical embodiment.

FIG. 6 is a detailed scheme of a wind farm having three individual sub-grids, wherein primary and secondary controllers are provided at each sub-grid, according to yet another typical embodiment. It is noted here that components which have been described with respect to FIGS. 4 and 5 are not described here in order to avoid a redundant description. A wind farm grid connected to the utility grid 900 is provided and includes at least two sub-grids 300, 400, 500 and the collector portion 905. At least one wind turbine is connected to each sub-grid 300, 400, 500, wherein the at least two sub-grids 300, 400, 500 are connected to the collector portion 905 and wherein the collector portion 905 establishes the connection to the utility grid 900. Each sub-grid 300, 400 and 500 includes a respective sub-grid measurement device, i.e. the first sub-grid 300 includes a first sub-grid measurement device 701, the second sub-grid 400 includes a second sub-grid measurement device 702, and the third sub-grid 500 includes a third sub-grid measurement device 703. Using these sub-grid measurement devices, reactive power components Q may be determined directly at the power lines of the respective sub-grids 300, 400 and 500. Thereby, at least one of said wind turbines may be controlled on basis of the determined reactive power components such that a desired reactive power value is attained. The desired actual power value may be provided at the collector portion 905.

In accordance with a typical embodiment which can be combined with other embodiments described herein, sub-grid controllers 801a, 802a, and 803a are provided at the individual sub-grids 300, 400, 500. In the embodiment illustrated in FIG. 6, a first sub-grid controller 801a may act as a primary sub-grid controller, whereas second and third sub-grid controllers 802a, 803a may be provided as secondary sub-grid controllers. As shown in FIG. 6, the first sub-grid 300 includes the first sub-grid controller 801a connected to the first sub-grid measurement device 701, the second sub-grid 400 includes the second sub-grid controller 802a connected to the second sub-grid measurement device 702, and the third sub-grid 500 includes the third sub-grid controller 803a connected to the third sub-grid measurement device 703. The sub-grid controllers 801a, 802a and 803a are connected to the individual wind turbine controllers via sub-grid data communication devices such as communication lines (broken lines in FIG. 6), i.e. the first sub-grid controller 801a is connected to the wind turbine controllers 311, 312 and 313, the second sub-grid controller 802a is connected to the wind turbine controllers 411 and 412, and the third sub-grid controller 803a is connected to the wind turbine controllers 511, 512, 513 and 514. Thereby, the first sub-grid controller 801a acting as the primary sub-grid controller and being operatively connected to the secondary sub-grid controllers 802a and 803a may be used for controlling the secondary sub-grid controllers 802a and 803a which in turn may control the respective wind turbines in the associated sub-grids 400 and 500. Thus, power generation at least one sub-grid 300, 400, 500 on the basis of the measured reactive power component Q may be provided such that the reactive power component Q is controlled with respect to at least one other sub-grid. The generation of electrical power with at least one of said wind turbines may be controlled and the generated electrical power may be fed to the sub-grid to which the at least one wind turbine is connected such that a reactive power component at each sub-grid may be determined. In this way, at least one of said wind turbines may be controlled on basis of the determined reactive power component such that a desired reactive power value is attained. The desired reactive power value may be provided at the collector portion 905. It is noted here that the first sub-grid measurement device 701 and/or the second sub-grid measurement device 702 and/or the third sub-grid measurement device 703 may include at least one sensor selected from the group consisting of a voltage sensor, a current sensor, a power meter, and VAR-sensor, and any combination thereof. The data communication lines between the individual wind turbines and the associated sub-grid controller 801a, 802a, 803a within a sub-grid (broken lines in FIG. 6) may be replaced by other communication devices such as, but not limited to, a local area network, a wireless LAN, Internet, an optical waveguide, and any combination thereof. According to yet another alternative embodiment which can be combined with other embodiments described herein, a measurement signal 903 and/or farm grid measurement signals output from the determination device 700 may be used for controlling the primary sub-grid controller 801a connected to the determination device 700 (dash-dotted line in FIG. 6). Moreover, the primary sub-grid controller 801a may be connected to a utility input device 901 for inputting a desired control status and/or utility commands for individual wind turbines, and to a human-machine interface 902 for inputting user commands. Thereby, the first sub-grid controller 801a acting as a primary sub-grid controller may take over a main control of the wind farm shown in FIG. 6.

Figure 7:
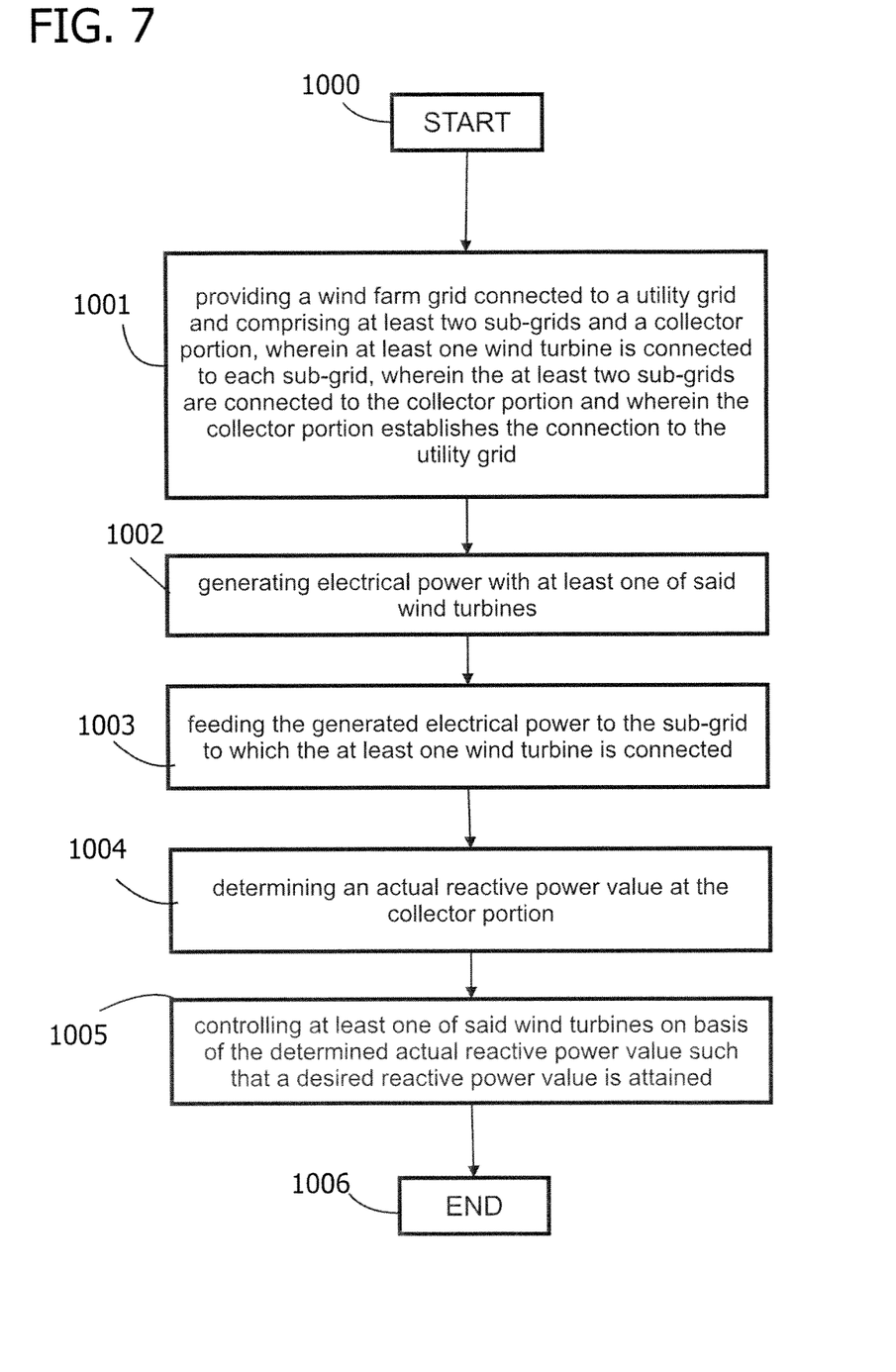
FIG. 7 is a flowchart illustrating a method of controlling a wind farm according to a typical embodiment.

FIG. 7 is a flowchart illustrating a method of controlling a wind farm according to a typical embodiment. At a block

1000, the procedure is started. A wind farm grid connected to a utility grid 900 and including at least two sub-grids and a collector portion is provided. At least one wind turbine is connected to each sub-grid, wherein the at least two sub-grids are connected to the collector portion and wherein the collector portion establishes the connection to the utility grid 900 (block 1001). Then, electrical power is generated with at least one of the wind turbines (block 1002). The generated electrical power is fed to the sub-grid to which the at least one wind turbine is connected (block 1003). Then, at a block 1004, an actual reactive power value at the collector portion is determined. At a block 1005, at least one of said wind turbines is controlled on basis of the determined actual reactive power value such that a desired reactive power value is attained. The procedure is ended at a block 1006.

Determining an actual reactive power value of the generated electrical power $\underline{S}$ in block 1003 may include measuring a current and a voltage at a high-voltage side of at least one sub-grid transformer 321, 421, 521. The procedure of controlling the reactive power component Q (block 1004 in FIG. 7) may include cancelling out reactive power Q of at least two adjacent sub-grids 300, 400, 500.

Controlling power generation at least one sub-grid on the basis of the measured reactive power component Q such that the reactive power component Q adjusted according to block 1004 may include communicating data signals between the wind farm controller 800 and at least one wind turbine, between the wind farm controller 800, at least one sub-grid controller 801, 802, 803 and individual wind turbines. Thus, controlling power generation at least one sub-grid on the basis of the measured reactive power component Q may include communicating data signals between a sub-grid controller 801, 802, 803 associated to at least one sub-grid 300, 400, 500 and at least one wind turbine of said sub-grid 300, 400, 500.

The method for transferring electrical power from a wind farm having at least two sub-grids and the reactive power controller for a wind farm arranged in at least two sub-grids according to typical embodiments described herein provides reduction of current compensation flow through one or more transformers. In this way, e.g. over-heating of wind turbines due to excessive reactive power transfer may be avoided. Furthermore, available Q resources of wind turbines which are not over-heated may be used to reduce Q components at over-heated wind turbines. In addition to that the method for transferring electrical power and the reactive power controller according to typical embodiments described herein may assist in avoiding penalty payments due to insufficient Q compensation at the point of interconnection (POI).

Figure 8:
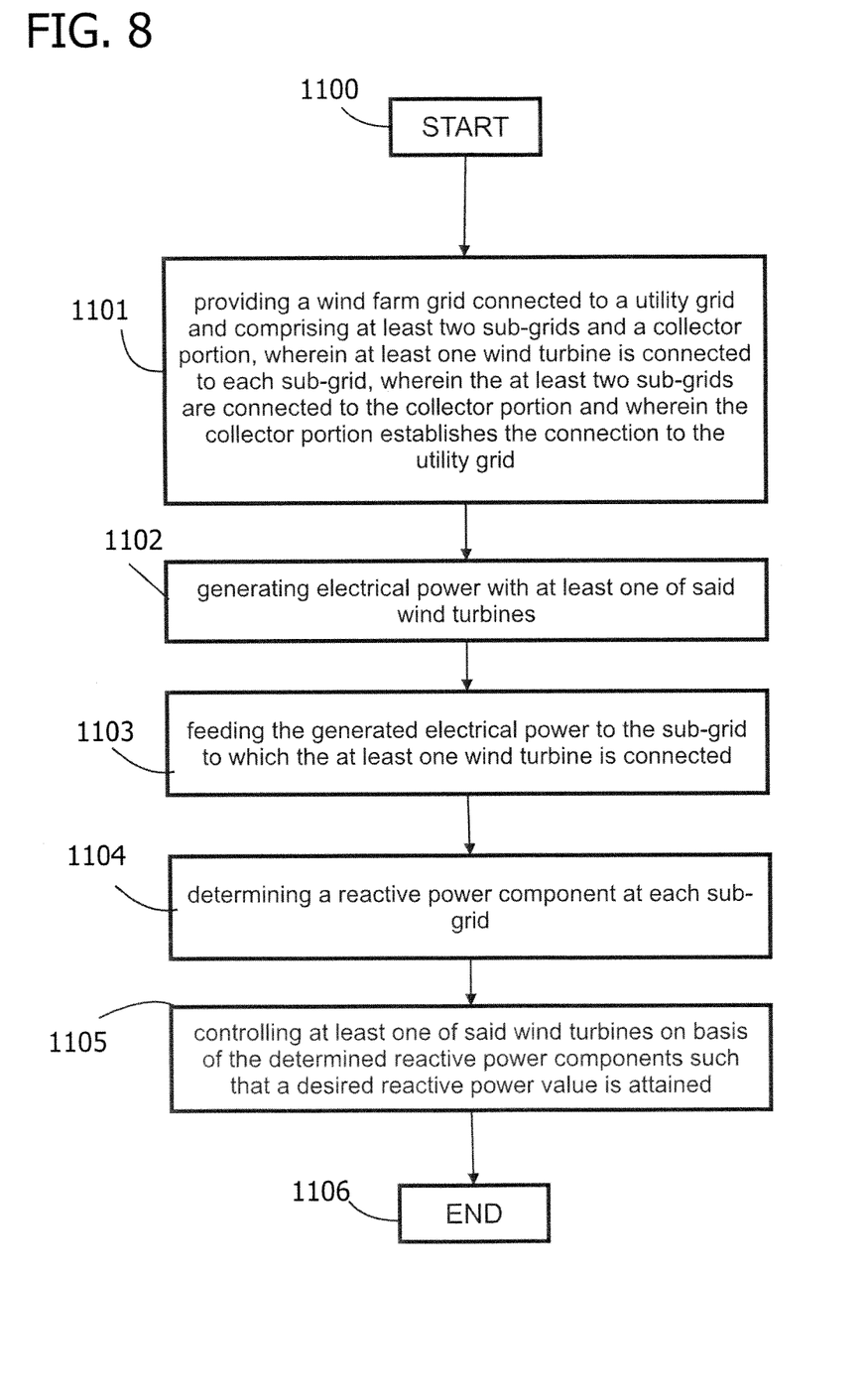
FIG. 8 is a flowchart illustrating a method of controlling a wind farm according to another typical embodiment.

FIG. 8 is a flowchart illustrating a method of controlling a wind farm according to a further typical embodiment. At a block 1100, the procedure is started. A wind farm grid connected to a utility grid 900 and including at least two sub-grids and a collector portion is provided. At least one wind turbine is connected to each sub-grid, wherein the at least two sub-grids are connected to the collector portion and wherein the collector portion establishes the connection to the utility grid 900 (block 1101). Then, electrical power is generated with at least one of the wind turbines (block 1102). The generated electrical power is fed to the sub-grid to which the at least one wind turbine is connected (block 1103). Then, at a block 1104, a reactive power component at each sub grid is determined. At a block 1105, at least one of said wind turbines is controlled on basis of the determined reactive power components such that a desired reactive power value is attained. The procedure is ended at a block 1106.

Exemplary embodiments of systems and methods for transferring electrical power from a wind farm having at least two sub-grids, to a utility grid are described above in detail. The systems and methods are not limited to the specific embodiments described herein, but rather, components of the systems and/or steps of the methods may be utilized independently and separately from other components and/or steps described herein. For example, a reactive power controller for a wind farm arranged in at least two sub-grids is not limited to practice with only the wind turbine systems as described herein. Rather, the exemplary embodiment can be implemented and utilized in connection with many other wind turbine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A reactive power controller for controlling reactive power in a wind farm grid connected to a utility grid and comprising at least two sub-grids and a collector, wherein at least one wind turbine is connected to each sub-grid of the at least two sub-grids, wherein the at least two sub-grids are connected to the collector and wherein the collector establishes the connection to the utility grid, the reactive power controller comprising:
   at least one sub-grid measurement device arranged at each sub grid, for measuring a reactive power component at each sub grid;
   at least one sub-grid controller operatively connected to the at least one sub-grid measurement device for controlling said at least one wind turbine on basis of the measured reactive power component at each sub grid such that a desired reactive power value is attained at each sub grid;
   a collector measurement device for determining an actual reactive power value at the collector; and
   a wind farm controller operatively connected to the collector measurement device for controlling at least one of the at least one sub-grid controller on a basis of the determined actual reactive power value at the collector such that the reactive power value attained at each sub grid results in a desired reactive power value at the collector.

2. The reactive power controller according to claim 1, further comprising a reactive power compensator for providing an output power factor of approximately one at the collector.

3. The reactive power controller according to claim 1, wherein at at least one of said at least two sub-grids:
   at least one of the at least one sub-grid controller is operable to control power generation at the at least one wind turbine on basis of the determined actual reactive power value at the at least one of said at least two sub-grids such that a reactive power value is set with respect to at least one other sub-grid of said at least two sub-grids.

4. The reactive power controller according to claim 1, further comprising at least one sub-grid data communication device for communicating data signals between at least one of said sub-grid controllers and said at least one wind turbine arranged in said at least two sub-grids, wherein the sub-grid data communication device is selected from a group consisting of a local area network, a wireless LAN, internet, an optical waveguide, and any combination thereof.

5. The reactive power controller according to claim 1, wherein the collector measurement device comprises at least one sensor selected from the group consisting of a voltage sensor, a current sensor, a power meter, a VAR-sensor, and any combination thereof.

6. The reactive power controller according to claim 1, wherein the at least one sub-grid measurement device comprises at least one sensor selected from the group consisting of a voltage sensor, a current sensor, a power meter, a VAR-sensor, and any combination thereof.

7. The reactive power controller according to claim 1, further comprising at least one data communication device for communicating data signals between the wind farm controller and the at least one wind turbine, wherein the data communication device is selected from a group consisting of a local area network, a wireless LAN, internet, an optical waveguide, and any combination thereof.

8. A reactive power controller for controlling reactive power in a wind farm grid connected to a utility grid and comprising at least two sub-grids and a collector, wherein at least one wind turbine is connected to each sub-grid of said at least two sub-grids, wherein each sub-grid is connected to the collector and wherein the collector establishes the connection to the utility grid, the reactive power controller comprising:

at least one sub-grid measurement device arranged at each sub grid, for measuring a reactive power component at each sub grid;

at least one sub-grid controller operatively connected to the at least one sub-grid measurement device for controlling said at least one wind turbine on basis of the measured reactive power component such that a desired reactive power value is attained at each sub grid; and a wind farm controller operatively connected to the at least one sub-grid controller for controlling the at least one sub-grid controller such that the reactive power value attained at each sub grid results in a desired reactive power value at the collector.

9. The reactive power controller according to claim 8, wherein one sub-grid controller is provided as a primary sub-grid controller at a first sub-grid and at least one further sub-grid controller is provided as a secondary sub-grid controller at at least a second sub-grid, the primary sub-grid controller being provided for controlling the at least one secondary sub-grid controller.

10. The reactive power controller according to claim 8, wherein the at least one sub-grid measurement device comprises at least one sensor selected from the group consisting of a voltage sensor, a current sensor, a power meter, a VAR-sensor, and any combination thereof.

11. The reactive power controller according to claim 8, further comprising at least one sub-grid data communication device for communicating data signals between at least one of said at least one sub-grid controller and said at least one wind turbine arranged within a sub-grid of said at least two sub-grids, wherein the at least one sub-grid data communication device is selected from a group consisting of a local area network, a wireless LAN, internet, an optical waveguide, and any combination thereof.

\* \* \* \* \*